United States Patent [19]

Stutzman

[11] 4,377,372
[45] Mar. 22, 1983

[54] WIND TURBINE

[76] Inventor: Carl Stutzman, 9581 Parade St., Anaheim, Calif. 92804

[21] Appl. No.: 319,243

[22] Filed: Nov. 9, 1981

[51] Int. Cl.³ .............................................. F03D 3/06
[52] U.S. Cl. ................................ 416/117; 416/197 A
[58] Field of Search ..................... 416/117, 118, 197 A

[56] References Cited

U.S. PATENT DOCUMENTS

| 13,268 | 7/1855 | Morgan | 416/117 |
|---|---|---|---|
| 346,797 | 8/1886 | Aylsworth | 416/117 |
| 362,557 | 5/1887 | Van Pelt et al. | 416/117 X |
| 427,846 | 5/1890 | Garcia-Sanchez | 416/117 X |
| 665,891 | 1/1901 | Fetty | 416/117 X |
| 797,140 | 8/1905 | Miller | 416/117 X |
| 885,141 | 4/1908 | Brown | 416/119 |
| 1,296,082 | 3/1919 | Huber | 416/117 |
| 1,360,221 | 11/1920 | Johnston | 416/117 X |
| 2,441,635 | 5/1948 | Iverson | 416/117 X |

FOREIGN PATENT DOCUMENTS

| 998721 | 1/1952 | France | 416/117 |
|---|---|---|---|
| 1038498 | 9/1953 | France | 416/117 |
| 40378 | 12/1957 | Poland | 416/117 |

Primary Examiner—Everette A. Powell, Jr.

[57] ABSTRACT

A wind turbine is provided which consists of novel vanes horizontally oriented about a rotating hub connected to a vertical shaft. The vanes are free to pivot about two horizontal hinges such that two vanes connected to each other open when wind force is applied, and close when there is little or no wind force such that there is a minimal amount of resistance to the travel of the vanes when the vanes are against the wind.

2 Claims, 5 Drawing Figures

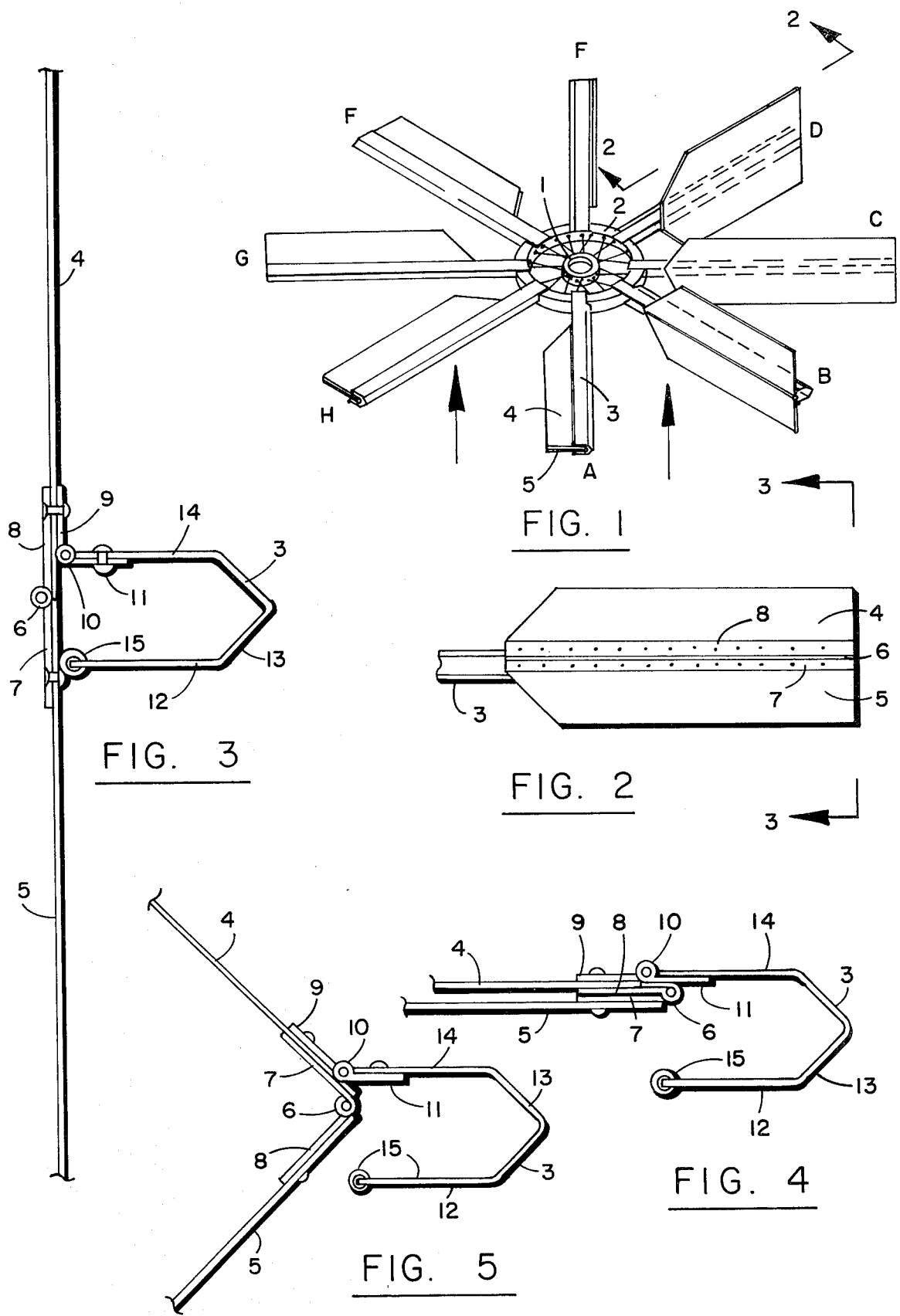

WIND TURBINE

INTRODUCTION

The invention relates to a novel wind turbine for utilization of energy from wind velocity.

In this age of energy scarcity, there is a need to develop maximum use of alternate energy sources such as wind provided by nature. Wind turbines have been developed and consist generally of various vanes or fins connected by a rod or thrust bar to a rotating hub wheel in direct communication to a vertical shaft. The wind when applied to the open vanes or fins rotates the hub in a horizontal direction and thus turns the vertical shaft providing energy which can be converted to electrical or mechanical energy.

The method by which the rotation of the vertical shaft is converted to other forms of energy is well known in the art and is not part of the invention herein. Also, methods of providing such rotation to a shaft by the circular movement of a hub or wheel is also known in the art and is not part of the novelty of this invention. The critical improvement of this invention relates to the means of maximizing wind force efficiency by dividing vanes which are open to wind force during the stage where wind is applied to rotate the hub while at the same time providing vanes or fins which can be closed and offer little or no resistance to wind during the state where the vanes are returned to a "start" position where the vanes flow against the wind. In this fashion there is maximum utilization of wind force.

Accordingly, one object of the invention is to provide wind turbine vanes which maximize use of wind force. Another object of the invention is to provide a device which maximizes the efficiency of a wind turbine. Other objects of the invention can be seen from the following description.

THE DRAWINGS

FIG. 1 shows an overall schematic view of the invention.

FIG. 2 shows the front view of the vanes in the "open" position.

FIG. 3 shows a side view of the vanes in the open position.

FIG. 4 shows a side view of the invention where the vanes are in the "closed" position.

FIG. 5 shows a side view of the vanes in the "middle" position.

Referring to FIG. 1, there is shown a vertical shaft 1 which, when rotated by the wind turbine, provides energy to other mechanical means not shown. Shaft 1 is either connected to or part of a horizontally rotating hub or wheel 2. Attached to the exterior of hub 2 are a series of rods or thrust bars 3 which are essentially the connecting means to vanes or fins 4 and 5. In the example shown in FIG. 1, there are shown eight separate sets of vanes connected to the thrust bar which in turn is connected to the circular wheel or hub. Each set of vanes are designated A, B, C, D, E, F, G and H. Shown for illustrative purposes are two arrows depicting the direction of the wind. The thrust bars are set and rotate in the horizontal position. As shown, in vane set A, vanes 4 and 5 are in the "closed" position; in set B, in the open position; in "C" in the opened position; in "D", in the opened position; in "E", in a closed position; in "F", in a closed position; in "G", in a closed position; and "H", in a closed position. The method or means by which the vanes are opened when wind force is applied and essentially closed when rotating against the wind is the essence of the invention and will be detailed later herein. The purpose of the device of this invention is to maintain the vanes in a "closed" position as the vanes flow against the wind as depicted in vane sets A, E, F, G, and H. As the vanes rotate so that wind again hits the vanes, the wind and gravity opens the vanes so that the vanes are in a fully open position and the vanes can more efficiently utilize wind force.

As can be seen by FIG. 1, as the wind rotates the vanes in a horizontal and circular direction, the hub is moved in a circular direction and rotates the shaft 1 which is in integral connection to the hub or wheel. Thus the wind provides mechanical energy which can be converted to other mechanical energy or electrical energy by means not shown.

FIG. 2 depicts the thrust bar 3 to which is connected the vane. Vanes 4 and 5 are connected by hinge 7 and 8 respectively, to a hinge pin 6 such that the vanes or fins 4 and 5 are free to rotate about hinge pin 6. Thrust bar 3 is essentially a circular or modified vee piece with one end being open as shown in FIGS. 3, 4 and 5 so that vane 5 is contained and cannot rotate more than 90 degrees. Accordingly, as will be seen more fully herein, the vanes can be 180 degrees apart, or essentially together or zero degrees apart.

FIG. 3 depicts a side view of the vanes and thrust bar of the invention. Vanes 4 and 5 are in a fully open position or 180 degrees apart. Hinge plates 7 and 8 connect the vanes to the standard hinge pin 6. Hinges are generally made of metal, however, it can be made of plastic or any other suitable construction material, as can the vanes and other parts of the invention herein. As seen in FIG. 3, vane 5 cannot be more than 180 degrees from vane 4 due to stop point 15 which is part of the circular or semi-circular thrust bar 3. Thrust bar 3 is a semi-circular piece or vee comprising several elements 12, 13 and 14 as shown. The essential elements of thrust bar 3 is a stop point 15 for vane 5, and an attachment point for connection of the two vanes to the bar for ultimate communication with the hub 2. The thrust bar can be circular in form or modified vee form as shown. Bar portion 14 connects to hinge 11. Hinge pin 10 is also connected to hinge plate 9 which, in turn, is connected to vane 4. Thus vane 4 is connected to both hinge 8 and hinge 9. Vane 5 is connected only to hinge 7. Thus, vane 4 rotates about hinge pin 10 as vane 4 is moved and thus moves vane 5 as will be more fully discussed herein.

FIG. 4 shows the vanes 4 and 5 in a "closed" position, as they would be in "A", "E", "F", "G", and "H" of FIG. 1. Thus, there is little or no wind resistance as the vane rotates against the wind for return position. In FIG. 4, thrust bar 3, which contains stop point 15, is connected to hinge plate 11 and hinge pin 10, utilizing upper portion of thrust bar 3. Vane 4 is connected to hinge plate 9 which also is connected to hinge 8, thus vane 4 is directly connected to and in communication and directs hinge 7. Hinge plate 7 is connected to vane 5 utilizing rivets or other connecting means.

FIG. 5 shows the vanes 4 and 5 in a partially open position. This state is normal for a "no wind" condition, and the vanes are moved by gravity only. FIG. 3 shows the vanes in an open position, and FIG. 4 shows the vanes in the position. As stated above vane set B is in the open position, as is C and D. As the vanes return against the flow of the wind and reach the position of A, the vane 5 closest to the ground begins to open due to gravity and due to not having any wind resistance against its opening. As vane 5 drops towards the ground due to gravity, hinges 8 and 9 rotate, thus pushing vane 4 upwards as can be seen comparing FIG. 4 and FIG. 5. The wind creates force on vanes 4 and 5 pushing vanes 4 and 5 further apart with thrust bar 3 inherently being forced to the left in reference to FIG. 5 and opening up the vane such that the vanes reach an angle of 180 degrees to one another and reach the position as shown in FIG. 3. Vane 5 cannot reach an angle to vane 4 more than 180 degrees due to stop point 15 of the thrust bar 3, and vane 4 cannot rotate further due to the connection between vane 5 and vane 4. Thus, the maximum degrees between the vanes is 180 degrees.

As the vanes reach the point as depicted in vane set E, there is little or no wind resistance against vane 4, and vane 4 begins to drop due to gravity, and vanes 4 and 5 reach a closed position upon return, and there is little or less wind resistance against the vanes as the vanes rotate to the position shown in A of FIG. 1.

Accordingly, the novel combination of two hinges, one hinge connected to both vanes, and the other hinge connected to another vane and fastened to the thrust bar, operate to form a flexible system whereunder the vanes are open while in a desired position for wind force, and closed such that there is little or no wind force to resist movement of the vanes back to the start or return position.

I claim:

1. A wind turbine vane system comprising:
   (a) A first and a second vane;
   (b) A thrust bar;
   (c) A first hinge communicating with said thrust bar and with said first vane;
   (d) A second hinge communicating with said first vane and with said second vane;
   (e) Means to connect said first hinge to said thrust bar and to said first vane;
   (f) Means to connect said second hinge to said first vane and to said second vane;
   (g) Said above elements arranged such that said vanes may be opened and closed by gravity and wind forces.

2. The wind turbine vane system of claim 1 wherein said thrust bar contains a stop point positioned to terminate any movement of said second vane which would result in any angle over 180 degrees between said second vane and said first vane.

* * * * *